United States Patent
Romer et al.

(10) Patent No.: US 7,356,401 B2
(45) Date of Patent: Apr. 8, 2008

(54) DRIVETRAIN PROTECTION AND MANAGEMENT SYSTEM

(75) Inventors: Richard A. Romer, Grosse Pointe Park, MI (US); Robert S. Harrison, Dryden, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 185 days.

(21) Appl. No.: 10/918,827

(22) Filed: Aug. 13, 2004

(65) Prior Publication Data
US 2006/0036361 A1    Feb. 16, 2006

(51) Int. Cl.
*B60T 8/00* (2006.01)
*G06F 19/00* (2006.01)

(52) U.S. Cl. ............... 701/84; 701/73; 701/82; 701/87; 303/186

(58) Field of Classification Search ............... 701/84, 701/71, 73, 74, 79, 80, 82, 69, 70, 91, 87; 303/186, 139, 140, 147; 180/197
See application file for complete search history.

(56) References Cited

U.S. PATENT DOCUMENTS

| | | |
|---|---|---|
| 5,343,780 A | 9/1994 | McDaniel |
| 6,226,587 B1 * | 5/2001 | Tachihata et al. ............. 701/72 |
| 6,436,005 B1 | 8/2002 | Bellinger |
| 6,440,038 B1 | 8/2002 | Holloway |
| 6,485,111 B2 * | 11/2002 | Suo et al. ..................... 303/20 |
| 6,546,329 B2 | 4/2003 | Bellinger |
| 6,923,514 B1 * | 8/2005 | Spieker et al. ............. 303/199 |
| 2005/0065693 A1 * | 3/2005 | Wang et al. .................. 701/70 |
| 2005/0171660 A1 * | 8/2005 | Woolford et al. ............. 701/33 |
| 2005/0256629 A1 * | 11/2005 | Tao et al. ..................... 701/87 |

FOREIGN PATENT DOCUMENTS

| | | |
|---|---|---|
| GB | 2365543 | 2/2002 |
| GB | 2388924 | 11/2003 |

* cited by examiner

*Primary Examiner*—Tan Q. Nguyen
(74) *Attorney, Agent, or Firm*—Carlson, Gaskey & Olds

(57) ABSTRACT

A drivetrain protection and management system (DPMS) monitors and determines individual wheel speeds to detect wheel spin and slip conditions on a drive axle. Wheel spin is caused by low surface friction, excessive input torque, lack of inter-axle differential and differential locks, excessive operating temperatures, or poor driving techniques. When wheel spin or slip exceeds a threshold, the DPMS automatically controls input torque to the drive axle by controlling engine or retarder torque. In addition to monitoring wheel speeds, the DPMS monitors other vehicle characteristics such as engine torque/speed, transmission ratio, transmission output speed, vehicle speed, throttle position, for example. The DPMS monitors and stores these vehicle characteristics over time and generates a data output that summarizes a history of vehicle operating conditions. The DPMS can communicate this data output real time during vehicle operation, which can be used by a fleet to maximize vehicle performance.

32 Claims, 3 Drawing Sheets

DRIVETRAIN PROTECTION AND MANAGEMENT SYSTEM

TECHNICAL FIELD

The subject invention relates to a drivetrain protection and management system that detects changes in wheel speed conditions and automatically reduces input torque to a drive axle to control wheel speed.

BACKGROUND OF THE INVENTION

Commercial vehicles are subjected to a variety of vehicle applications and are required to operate in a wide range of environmental and load conditions. For example, some commercial vehicles, such as tractor-trailers, are required to travel long distances over highways with few stops and are subjected to high heat in desert areas and steep grades in mountainous areas. Other commercial vehicles, such as delivery trucks, operate within a city and/or associated suburban area and perform multiple starts and stops each day. These commercial vehicles each have a drivetrain that must be able to operate in a variety of applications under high loads and over a wide range of environmental conditions.

Commercial vehicle drivetrains include components such as an engine, transmission, transfer case, driveline, drive axle, differential assembly, and inter-axle differential assembly, for example. During vehicle operation, any one of these components could experience conditions that could lead toward early failure due to shock loads, fatigue, overload, and/or overheating. Often these conditions result in excessive wheel spin, which is caused by low surface friction, excessive input torque, lack of inter-axle and differential axle locks, excessive operating temperatures, and/or poor driving techniques. Excessive wheel spin can result in permanent damage to one or more drivetrain components.

It is often difficult to distinguish between component failures caused by component quality issues, or failures caused by vehicle application or driver abuse. One solution to avoid component failures for certain vehicle applications has been to over-specify components. This means that because there is a high risk of abuse in certain applications, heavier and more durable components are used instead of lighter components, which under normal usage would be sufficient. This increases the overall cost of the drivetrain and also adversely affects fuel economy due to the heavier weight.

It would be beneficial to provide a drivetrain protection and management system that would identify and correct wheel slip conditions as well as monitoring and storing vehicle characteristic data over time to better understand causes of drivetrain component failures.

SUMMARY OF THE INVENTION

A drivetrain protection and management system (DPMS) monitors various vehicle characteristics to identify changes in wheel speed conditions. The DPMS determines individual wheel speeds to detect a wheel spin or slip condition on a drive axle. When wheel spin or slip is identified a controller compares a wheel spin or slip value to a threshold value. If the wheel spin or slip value exceeds the threshold value, the DPMS automatically controls input torque to the drive axle.

The DPMS includes a controller that can be a separate control unit or can be incorporated into an anti-lock brake controller. Preferably, the DPMS monitors wheel speed by using existing wheel sensors from an anti-lock brake system.

When excessive wheel spin is identified based on wheel speed measurements, the DPMS generates a control signal to reduce input torque to the drive axle by controlling engine or retarder torque. When the DPMS is activated, i.e. when the DPMS identifies excessive wheel spin, a warning signal is communicated to a vehicle operator. The warning signal can be visual, audible, or a combination of both.

In addition to monitoring wheel speeds, the DPMS monitors other vehicle characteristics such as engine torque/speed, transmission ratio, transmission output speed, vehicle speed, and throttle position, for example. The DPMS monitors and stores these vehicle characteristics over time and generates a data output that summarizes a history of vehicle operating conditions. The DPMS can communicate this data output, including wireless transmissions in real time, to a fleet control center during vehicle operation. This provides a better understanding of how drivetrain component failure is initiated and how the component failure progresses over time.

Further, monitoring the various vehicle characteristics improves drivetrain performance and reliability. By utilizing existing hardware and software components, such as the wheel speed sensors and control unit from the anti-lock brake system for example, the DPMS monitors vehicle operating conditions and automatically intervenes as necessary to prevent drivetrain component failures due to shock loads, fatigue, overload, or overheating.

These and other features of the present invention can be best understood from the following specification and drawings, the following of which is a brief description.

DETAILED DESCRIPTION OF THE PREFERRED EMBODIMENT

Figure 1:
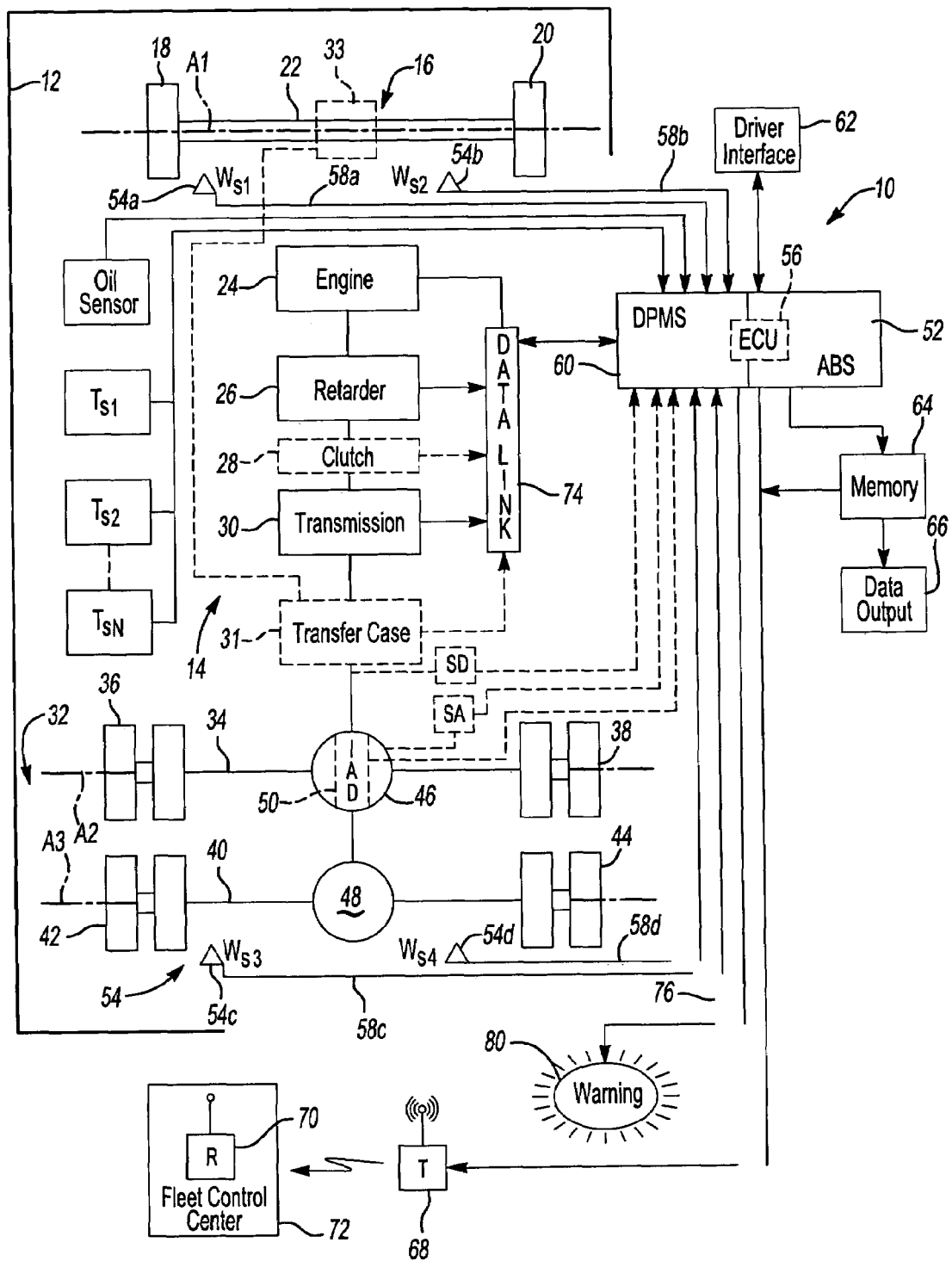
FIG. 1 is a schematic diagram of a vehicle drivetrain incorporating the subject invention.

A drivetrain protection and management system (DPMS) 10 for a vehicle 12 is shown in FIG. 1. The DPMS 10 can be used for many different drivetrain configurations. The vehicle 12 is shown in FIG. 1 with a drivetrain 14. Drivetrain 14 is just one example of a drivetrain for the vehicle 12.

The vehicle 12 includes a front non-drive steer axle 16 with first 18 and second 20 laterally spaced wheels that rotate about a common axis A1. An axle beam 22 extends between the first 18 and second 20 laterally spaced wheels. In the example shown, drivetrain 14 includes an engine 24, retarder 26, a clutch 28, a transmission 30, a transfer case 31 and a tandem drive axle assembly 32. The tandem drive axle assembly 32 includes a forward-rear axle 34 with first 36 and second 38 laterally spaced wheels that rotate about a common axis A2, and a rear-rear axle 40 with first 42 and second 44 laterally spaced wheels that rotate about a common axis A3. When a transfer case 31 is used, the front non-drive steer axle 16 is replaced by a front drive axle which includes a front differential assembly 33. The transfer case 31 can be selectively coupled to the front differential assembly 33 to provide driving input into the front drive axle.

The forward-rear axle 34 includes a carrier 46 with a differential assembly that drives the first 36 and second 38 laterally spaced wheels. The rear-rear axle 40 includes a carrier 48 with a differential assembly that drives the first 42 and second 44 laterally spaced wheels. The forward-rear axle 34 may or may not include an inter-axle differential assembly 50 for input speed differentiation to the forward-rear 34 and rear-rear 40 axles. The operation of differential assemblies and inter-axle differential assemblies is well-known and will not be discussed in further detail.

The vehicle 12 also includes an anti-lock brake system (ABS) 52 having a plurality of wheel speed sensors 54 that communicate with an ABS controller 56. First 54a and second 54b wheel speed sensors respectively monitor wheel speeds at the first 18 and second 20 laterally spaced wheels of the front non-drive steer axle 16. The first 54a and second 54b wheel speed sensors generate first 58a and second 58b wheel speed signals, respectively. Third 54c and fourth 54d wheel speed sensors respectively monitor wheel speeds at the first 42 and second 44 laterally spaced wheels of the rear-rear axle 40. The third 54c and fourth 54d wheel speed sensors generate third 58c and fourth 58d wheel speed signals, respectively.

The first 36 and second 38 laterally spaced wheels for the forward-rear axle 34 typically are not monitored or are "unsensed" wheels, i.e. they do not have individual wheel sensors. The DPMS 10 can determine wheel speeds for the first 36 and second 38 laterally spaced wheels of the forward-rear axle 34. This will be discussed in greater detail below. Optionally one or two additional wheel speed sensors could be used for the first 36 and second 38 laterally spaced wheels on the forward-rear axle 34, however, this would increase system cost.

The DPMS 10 includes a DPMS control unit 60. The DPMS control unit 60 can be a separate control unit that communicates with other vehicle system control units, however, the DPMS control unit 60 is preferably incorporated into the ABS 52. Thus, the DPMS control unit 60 and the ABS controller 56 would operate from a common controller or electronic control unit. A driver interface 62, located in a vehicle cab, communicates with the DPMS control unit 60. The driver interface 62 can be any type of known interface such as a lamp, touch screen, or keypunch system, for example.

The DPMS 10 monitors a plurality of vehicle characteristics such as wheels speeds as measured by the ABS 52. These vehicle characteristics are continuously or intermittently monitored over time, are entered as input data into the DPMS 10, and are stored in memory 64. The memory 64 can be accessed to provide a data output 66 that summarizes or lists a history of all of the input data. Optionally, the DPMS 10 can include a transmitter 68 that can transmit vehicle characteristic data to other devices or systems, including wireless transmissions to a receiver 70 located remotely from the vehicle 12. The receiver 70 could be located at a fleet control center 72, for example. The transmitter 68 could transmit data real time or could intermittently transmit data as requested from the fleet control center 72.

The vehicle characteristics monitored by the DPMS 10 also include characteristics from other drivetrain components. The DPMS 10 accesses data for these other drivetrain components via a data-link 74. Thus, for example, the engine 24, retarder 26, clutch 28, transmission 30, and/or transfer case 31 each have input data available, such as operational speed, temperature, torque, etc., which can be accessed by the DPMS 10 via the data-link 74. This will be discussed in greater detail below.

The DPMS 10 monitors the various vehicle characteristics in order to improve drivetrain performance and reliability.

The DPMS 10 uses the input data from the data-link 74 and from the ABS 52 to determine whether a driven wheel is experiencing a wheel spin or slip condition, which could lead to early drivetrain component failure. Excessive wheel spin or slip is caused by low surface friction, excessive input torque, lack of inter-axle and differential axle locks, excessive operating temperatures, and/or poor driving techniques. If the DPMS 10 detects an excessive wheel spin condition at a driven wheel, the DPMS 10 can utilize existing hardware and software components in the vehicle 12 to intervene when necessary to prevent drivetrain failures due to shock loads, fatigue, overload, or overheating.

The DPMS 10 intervenes by controlling input torque into an axle supporting a driven wheel experiencing wheel spin or slip. When excessive wheel spin is detected and the DPMS 10 intervenes, a warning signal 76 is generated. The warning signal 76 can provide a visual warning to the driver, or an audible warning, or both. The warning signal 76 notifies the driver that the DPMS 10 is active. The driver can then correct a poor driving technique or have the vehicle 12 properly serviced as needed. Optionally, or in addition to, the warning signal 76 could also be communicated to the fleet control center 72.

Figure 2:
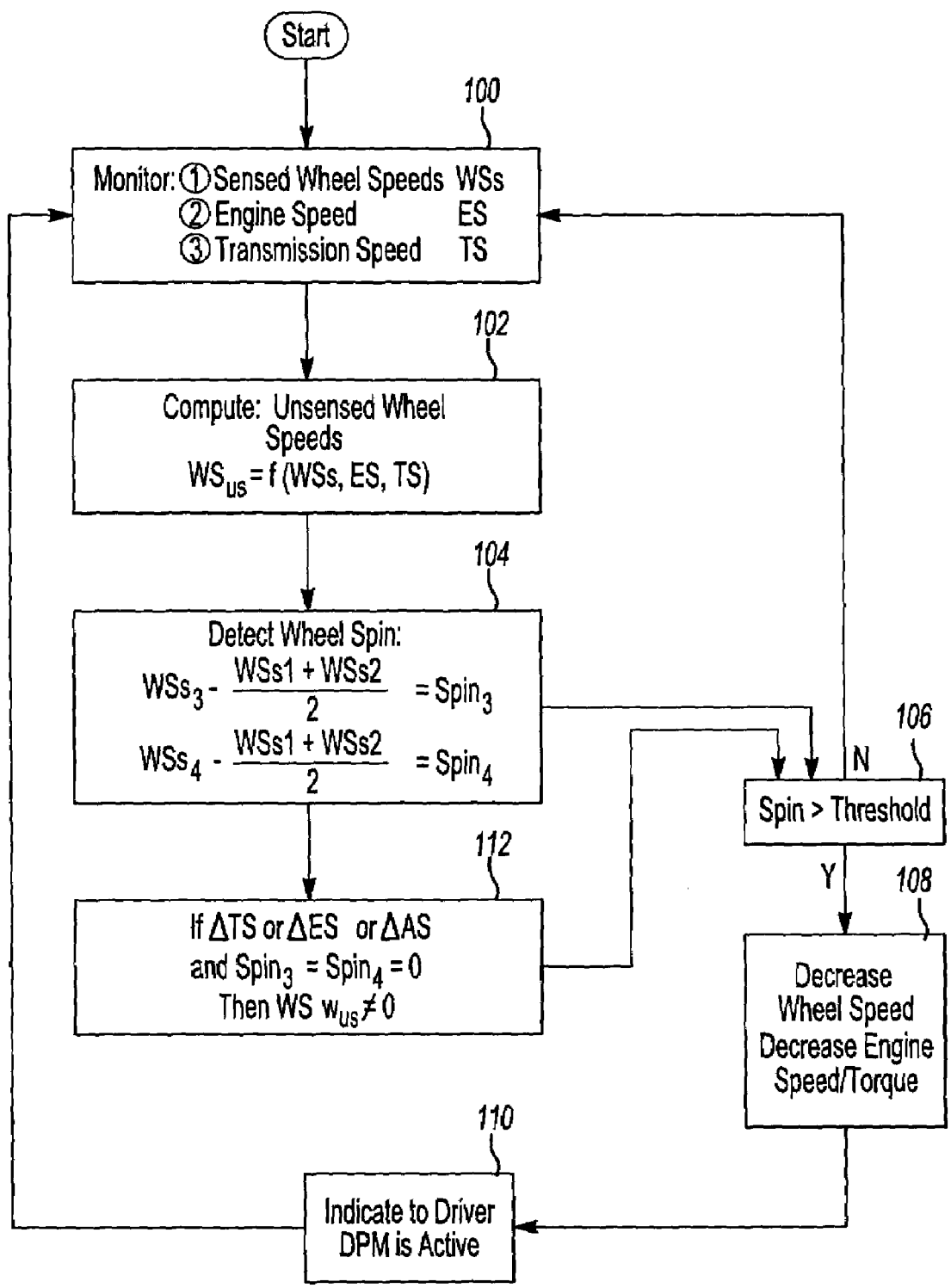
FIG. 2 is a flowchart describing one method of detecting wheel spin.

One example of how the DPMS 10 operates is shown in FIG. 2. In this example, the DPMS at 100 monitors engine speed and transmission speed via the data-link 74, and monitors wheel speeds via the ABS 52 as described above. At 102, the DPMS 10 calculates wheel speeds at unsensed wheels as a function of sensed wheel speeds and engine and transmission speeds. An example of unsensed wheels on the vehicle 12 would be the first 36 and second 38 laterally spaced wheels on the forward-rear axle 34.

At 104, the DPMS 10 determines whether a wheel spin condition exists for one of the first 42 or second 44 laterally spaced wheels of the rear-rear axle 40. Spin at the first wheel 42 is detected by determining an average for the sensed wheel speeds for the first 18 and second 20 laterally spaced wheels for the front non-drive steer axle 16. This average is subtracted from the sensed wheel speed of the first wheel 42, as shown below:

$$(WS3)-[(WS1+WS2)/2]=\text{SPIN 3}$$

WS3 represents the sensed wheel speed at the first wheel 42 of the rear-rear axle 40, WS1 represents the sensed wheel speed at the first wheel 18 of the front non-drive steer axle 16, and WS2 represents the sensed wheel speed at the second wheel 20 of the front non-drive steer axle 16.

Spin at the second wheel 44 of the rear-rear axle 40 is detected in a similar manner as shown below:

$$(WS4)-[(WS1+WS2)/2]=\text{SPIN 4}$$

WS4 represents the sensed wheel speed at the second wheel 44 of the rear-rear axle 40, WS1 represents the sensed wheel speed at the first wheel 18 of the front non-drive steer axle 16, and WS2 represents the sensed wheel speed at the second wheel 20 of the front non-drive steer axle 16.

If either SPIN 3 or SPIN 4 is zero then the respective wheel is in a no-spin condition. If either SPIN 3 or SPIN 4 is greater than or less than zero, then the respective wheel is in a spin condition. A spin value is determined for SPIN 3 and/or SPIN 4. This spin value is compared to a spin threshold at 106. If the spin value does not exceed the spin threshold, the DPMS 10 returns to 100. If the spin value exceeds the spin threshold, the DPMS 10 intervenes at 108 to reduce wheel speed by reducing input torque into the driven wheel identified as experiencing excessive wheel spin. When the DPMS 10 is active, the driver is notified at 110.

The DPMS 10 can reduce wheel speed in a variety of different manners. In one example, the DPMS 10 reduces wheel speed by decreasing engine torque/speed. In another example, wheel speed is reduced by controlling retarder torque. The retarder 26 can be an engine retarder or any other type of drivetrain retarder known in the art. In either example, the DPMS 10 would generate a control signal that would be communicated to the appropriate drivetrain component, i.e. the engine or retarder.

The DPMS 10 can also detect whether unsensed wheels are experiencing wheel spin, as indicated at 112. An example of unsensed wheels in vehicle 12 would be the first 36 and second 38 laterally spaced wheels for the forward-rear axle 34. The DPMS 10 determines whether there is a change in transmission speed $\Delta TS$, a change in engine speed $\Delta ES$, or a change in axle speed $\Delta AS$, and determines whether SPIN 3 and/or SPIN 4 are approximately zero. If SPIN 3 and SPIN 4 are approximately zero and if there is a change in axle, transmission, or engine speed, then wheel speed at the unsensed wheel cannot be zero. In other words, if the sensed wheels are not experiencing wheel spin and there is a change in axle, engine, or transmission speed, then the unsensed wheels could be experiencing an excessive wheel spin condition. If wheel spin is detected for an unsensed wheel, a spin value is assigned and compared to the spin threshold at 106. The DPMS 10 would intervene to reduce wheel speed as necessary at 108.

Figure 3:
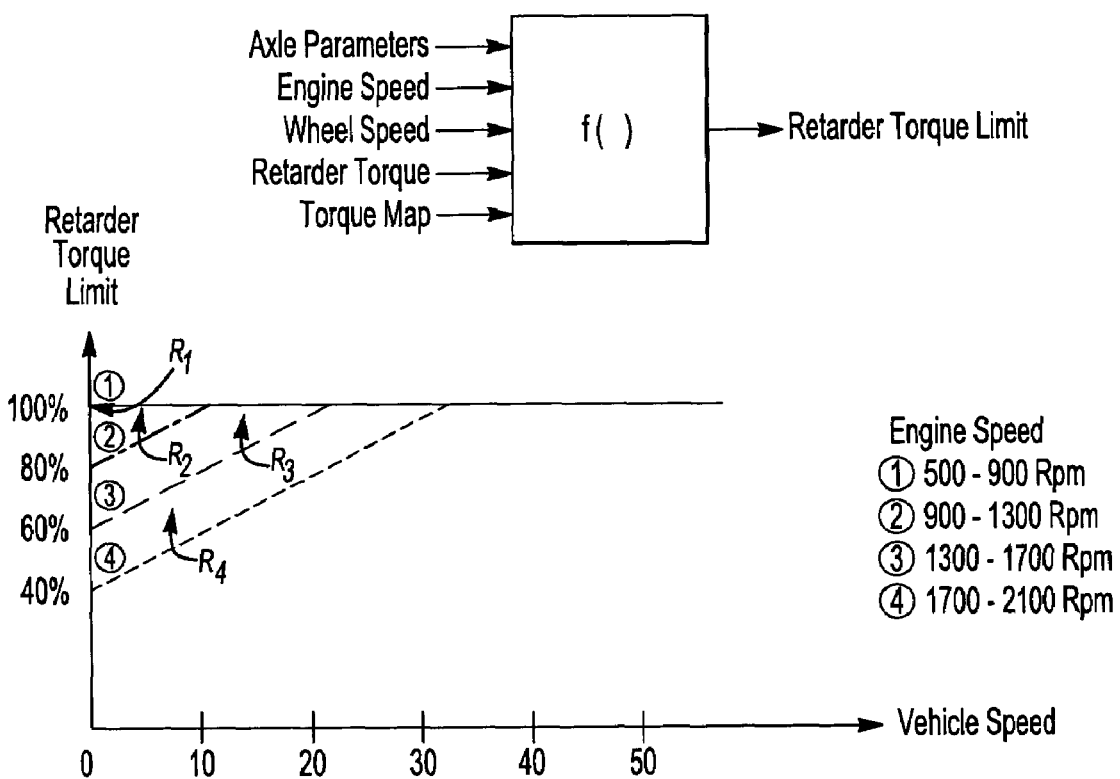
FIG. 3 is a graph of retarder torque limit versus vehicle speed.

If retarder torque is used to reduce wheel speed, the retarder torque limits should be considered. An example is shown in FIG. 3. In this example, retarder torque is limited at low vehicle speeds and low transmission gears to protect axle gears operating on a coast side. Retarder torque limit is a function of vehicle characteristics such as operating axle parameters, operating engine speed, operating wheel speed, operating retarder torque, and an engine torque map.

As shown in FIG. 3, for engine speeds in the 500-900 revolutions per minute (rpm) range, indicated as range R1, the retarder torque limit would be 100%, i.e. the torque would not be limited. At engine speeds in the 900-1300 rpm range, indicated as range R2, the retarder torque limit would be between 80% and 100%. At engine speeds in the 1300-1700 rpm range, indicated as range R3, the retarder torque limit would be between 60% and 80%. At engine speeds in the 1700-2100 rpm range, indicated as range R4, the retarder torque limit would be between 40% and 60%. It should be understood that these engine speed and retarder torque limit ranges are just one example of appropriate ranges and that other ranges could also be used depending on vehicle application and other operating characteristics.

As discussed above, the DPMS 10 could be a separate module or could be implemented within other existing system modules found on the vehicle 12. Further, the DPMS 10 utilizes data communications that already occur between the respective system modules. Preferably, the DPMS 10 is integrated into the ABS controller 56 where a large amount of useful information for protecting the drivetrain 14 is already present.

The DPMS 10 receives various inputs from separate sensors or from existing system modules. These inputs comprise data pertaining to many different vehicle characteristics. As discussed above, individual wheel speeds can be determined by accessing information from the ABS 52. Engine speed, engine torque, and driver throttle position data can be accessed via the data-link 74. Retarder information (speed and torque data) is also available over the data-link 74. The retarder 26 can be any type of drivetrain retarder and the drivetrain 14 may include more than one retarding mechanism.

Transmission ratio and output speed data can also be accessed via the data-link 74. Additional computations may need to be performed to determine the current operational transmission gear ratio, however, this is within the scope of knowledge of one of ordinary skill in the art.

Axle speed data can also be accessed via the datalink 74. Axle speed can be determined by a driveline sensor SD or an axle speed sensor SA. The axle speed sensor SA can be external or internal to the tandem drive axle assembly 32.

Vehicle speed can be accessed via the data-link 74. The vehicle speed can also be computed based on wheel speed data from the ABS 52. The vehicle speed from the data-link 74 can be compared to the vehicle speed computed based on wheel speed as a double check.

Operating temperatures of the various drivetrain components can be accessed via the data-link or can be measured with separate sensors Ts1, Ts2 . . . Tsn, as shown in FIG. 1. Thus, engine temperature, transmission temperature, transfer case temperature, axle temperature, etc. can be monitored as needed.

Axle oil temperature and quality can also be provided as inputs to the DPMS 10. Separate sensors can be used as described above, or the oil temperature and quality can be determined based on engine temperature and power loads. Optionally, the oil temperature and quality could be estimated based on severity of operation and other measured input data.

The DPMS 10 can also determine vehicle characteristics such as vehicle operational road surface, vehicle mass, operational road grade, and tire circumference variances including pressure. Operational road surface conditions can be determined based on wheel speed and spin data from the DPMS control unit 60 and/or the ABS controller 56. Tire pressure can also be calculated based on known tire information and data from the ABS controller 56.

Vehicle mass can be determined based on data from the ABS 52 and engine 24 via the data-link 74. The DPMS 10 can determine engine torque and acceleration during vehicle operation. Force equals mass multiplied by acceleration (F=ma). Thus, by knowing the engine torque and vehicle acceleration, the mass of the vehicle can be determined. This provides useful information with regard to whether the vehicle is being operated in overloaded conditions.

The DPMS 10 also determines a duration for each wheel spin event. The DPMS 10 times each wheel spin event when the spin threshold is exceeded by using a counter and assigns a wheel spin time value to the event. The wheel spin time value is compared to a predetermined wheel spin time period. If the wheel spin time value exceeds the predetermined wheel spin time period, the wheel spin event is designated as a significant wheel spin event, is stored in memory 64, and is accessible as data output 66. This provides useful information such as how often and how long the vehicle experiences wheel spin conditions.

The DPMS 10 monitors and calculates the various vehicle operational characteristics described above to improve drivetrain performance and reliability. The DPMS control unit 60 uses the input data of the various vehicle characteristics to monitor drivetrain operation and automatically intervenes as necessary to prevent drivetrain failures due to shock loads, fatigue, overload, or overheating. The DPMS 10 can monitor wheel speeds to detect a change in surface coefficients and can limit engine power to prevent shock loads through the drivetrain.

Many different methods can be used to control torque through the drivetrain 14. In one example, the DPMS 10 limits retarder torque at low speeds and gears to prevent overloading. Retarder torque can then be ramped up to prevent shock loads. Optionally, or in addition to limiting retarder torque, engine torque can be limited at low speeds and gears to prevent overloading. Also, transmission torque and output speed can be controlled. Wheel brake applications and spring brakes could also be used to control torque through the drivetrain 14.

Spin out failure of differential assemblies in the carriers 46, 48 can be prevented by detecting a wheel spin condition where one wheel encounters a lower friction surface and accelerates under power while the remaining wheels remain stationary. The method of identifying wheel spin is discussed in detail above. When an excessive wheel spin condition is detected, the DPMS 10 prevents damage by reducing engine or retarder torque.

As discussed above, this protection can also be used for wheels that are "unsensed," i.e. do not have wheel speed sensors. Optionally, to achieve a higher degree of performance, one wheel speed sensor could be installed on an unsensed axle to provide additional information. This would provide more accurate information to calculate spin on an opposite wheel of the unsensed axle.

Automatic control of locks for the inter-axle differential assembly 50 and for the differential assemblies for the carriers 46, 48 can also prevent damage. The DPMS 10 can automatically lock the inter-axle differential assembly 50 or differential gear assemblies when a wheel spin threshold is exceeded and the corresponding wheel speeds and engine torque are less than a predetermined threshold. This reduces the likelihood of shock load failure. Further, the DPMS 10 could automatically unlock the inter-axle differential assembly 50 or differential assemblies when vehicle speed exceeds a predetermined speed threshold.

The DPMS 10 includes an indicator 80 that is used to inform the driver when the drivetrain 14 is being controlled by the DPMS 10. The indicator 80 can also inform the driver that the drivetrain 14 is experiencing high loads, or that drivetrain maintenance is recommended. The indicator 80 can be a visual indicator, such as a lamp or message on a display, or an audible indicator, or a combination of both. The indicator 80 receives the warning signal 76 to inform the driver of the DPMS activation as described above.

The DPMS 10 can also be used to detect tire mismatch via data from the ABS 52. Tire dynamic rolling radius mismatch, either side-to-side or front to rear, on the tandem drive axle assembly 32 results in rolling radius variations. These rolling radius variations cause axle stress if isolated by a differential assembly in the carriers 46, 48. The tire pressure can influence rolling radius and can be monitored via the ABS 52 as described above. When a mismatch is detected, the DPMS 10 can inform the driver via the indicator 80. Service operations can then be performed as needed.

Also, as described above, the DPMS 10 can be used for data acquisition purposes. Recording and processing input data on the various vehicle conditions provides important information to improve understanding of component failures, application severity, and to identify driver abuse. Information that the DPMS 10 could provide as the data output 66 could include operating temperatures, loads, drive warning/indicator status, system activation counters, duration of high stress usage, axle lock engagement, oil quality, and maintenance, for example. This data could be accessed by the driver or fleet operator at the vehicle or could be transmitted to a remote location at the fleet control center 72.

The data output 66 also provides valuable information that can be used to set vehicle operating parameters. The operating parameters could be set by an OEM, dealer, fleet owner, individual vehicle owner, and/or a component manufacturer depending upon the particular parameter, vehicle specification, and operating conditions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for protecting and managing a drivetrain system comprising:

monitoring a first wheel speed for a first wheel and a second wheel speed for a second wheel wherein the first and second wheels rotate about a first common axis;

monitoring a third wheel speed for a third wheel and a fourth wheel speed for a fourth wheel wherein the third and fourth wheels rotate about a second common axis defined by a drive axle;

determining a wheel speed for at least one unmonitored wheel as a function of monitored wheel speeds;

determining whether the third wheel is operating in a spin condition, a slip condition, or a no-spin condition based on the first, second, third, and fourth wheel speeds;

determining whether the fourth wheel is operating in a spin condition, a slip condition, or a no-spin condition based on the first, second, third, and fourth wheel speeds;

determining if a spin threshold is exceeded when at least one of the unmonitored wheels, the third wheel, and the fourth wheels is in the spin condition; and generating a control signal to control wheel speed by controlling input torque into the drive axle when the spin threshold is exceeded.

2. The method according to claim 1 including generating the control signal as an engine control signal to reduce engine torque.

3. The method according to claim 1 including generating the control signal as an engine retarder control signal.

4. The method according to claim 1 including providing a drivetrain control module for generating the control signal wherein the drivetrain control module is separate from an engine control module.

5. The method according to claim 4 including incorporating the drivetrain control module into an anti-lock braking system control module.

6. The method according to claim 1 including communicating a warning to a vehicle operator to indicate that torque is being controlled to protect and manage a drivetrain or that maintenance is required.

7. The method according to claim 1 including detecting wheel spin for an unmonitored driven wheel that does not have wheel speed sensors by monitoring engine speed;

monitoring transmission speed;

monitoring driveline speed;

determining whether there is a change in engine speed, driveline speed, or transmission speed;

detecting a wheel spin condition at the unmonitored driven wheel when both the third and fourth wheels are in a no-spin condition and there is a change in speed of at least one of the engine, driveline, and transmission speeds;

determining an unmonitored wheel spin value when the wheel spin condition is detected for the unmonitored driven wheel;

comparing the unmonitored wheel spin value to the spin threshold; and generating the control signal to decrease wheel speed by reducing engine torque when the unmonitored wheel spin value exceeds the spin threshold.

8. The method according to claim 1 including monitoring a plurality of vehicle characteristics over time wherein the plurality of vehicle characteristics includes at least the first, second, third, and fourth wheel speeds, storing vehicle characteristic data in memory, and generating a data output summarizing a history of the vehicle characteristics.

9. The method according to claim 8 including communicating the data output to a fleet control center located remotely from a vehicle having the drive axle.

10. The method according to claim 9 including wirelessly communicating the data output to the fleet control center during vehicle operation.

11. The method according to claim 9 wherein monitoring the plurality of vehicle characteristics includes monitoring at least engine speed, engine torque, vehicle speed, transmission ratio, and transmission output speed over time.

12. The method according to claim 8 including monitoring the first, second, third, and fourth wheel speeds with first, second, third, and fourth wheel speed sensors, respectively, from an anti-lock brake system and generating the control signal from an anti-lock brake controller.

13. The method according to claim 12 wherein monitoring the plurality of vehicle characteristics includes monitoring engine speed, engine torque, and vehicle speed over time via a datalink that is in communication with the anti-lock brake controller.

14. The method according to claim 13 including determining a duration each time one of the third or fourth wheels is in the spin condition, comparing the duration to a duration time threshold, identifying a spin duration event each time the duration exceeds the duration time threshold, and storing each spin duration event in memory.

15. The method according to claim 14 wherein monitoring the plurality of vehicle characteristics includes monitoring an operating ratio for a transmission and transmission output speed over time via the datalink that is in communication with the anti-lock brake controller.

16. The method according to claim 15 including controlling drivetrain torque with a drivetrain retarder via the control signal to reduce input torque to the drive axle when at least one of the third and fourth wheels is in the slip condition.

17. The method according to claim 16 including automatically locking an inter-axle differential or main axle differential when the spin threshold is exceeded and the third and fourth wheel speeds are less than a predetermined inter-axle differential engagement threshold.

18. The method according to claim 17 including automatically unlocking the inter-axle differential or main axle differential when vehicle speed exceeds a predetermined speed threshold.

19. The method according to claim 18 wherein monitoring the plurality of vehicle characteristics includes monitoring at least one of axle oil temperature, vehicle mass, road grade, road surface, engine temperature, or tire pressure over time.

20. The method according to claim 1 wherein the drive axle comprises a tandem drive axle including a forward-rear axle and a rear-rear axle that receives driving input from the forward-rear axle, and including the steps of:

associating the third and the fourth wheels with the rear-rear axle;

associating fifth and sixth wheels with the forward-rear axle wherein the fifth and sixth wheels comprise unmonitored driven wheels;

determining wheel speeds for the unmonitored driven wheels based on the first, second, third, and fourth wheel speeds;

determining if any of the unmonitored driven wheels are experiencing a spin condition; and generating the control signal if a spin condition is detected at one of the unmonitored driven wheels.

21. The method according to claim 20 including associating the first and second wheels with a front axle that is one of a front non-drive axle and a front drive axle.

22. The method according to claim 21 wherein the front axle is the front drive axle that has a drive configuration and a non-drive configuration, and including selectively coupling the front drive axle to a transfer case to receive driving input to achieve the drive configuration.

23. A drivetrain protection and management system comprising:

a first wheel speed sensor generating a first wheel speed signal for a first wheel;

a second wheel speed sensor generating a second wheel speed signal for a second wheel wherein the first and second wheels rotate about a first common axis;

a third wheel speed sensor generating a third wheel speed signal for a third wheel;

a fourth wheel speed sensor generating a fourth wheel speed signal for a fourth wheel wherein the third and fourth wheels rotate about a second common axis defined by a drive axle; and a drivetrain protection and management control unit for determining wheel speeds for at least one unmonitored wheel as a function of monitored wheel speeds, and for determining whether at least one of the unmonitored wheels, the third wheel, and the fourth wheel is operating in a spin condition, a slip condition, or a no-spin condition based on the first, second, third, and fourth wheel speed signals, determining if a spin threshold is exceeded when at least one of the unmonitored wheels, the third wheel, and the fourth wheel is in the spin condition, and generating a control signal to control wheel speed by controlling input torque into the drive axle when the spin threshold is exceeded.

24. The drivetrain protection and management system according to claim 23 wherein said drivetrain protection and management control unit is incorporated into an anti-lock brake controller.

25. The drivetrain protection and management system according to claim 23 wherein said drivetrain protection and management control unit monitors a plurality of vehicle characteristics over time wherein the plurality of vehicle characteristics includes at least first, second, third, and fourth wheel speeds and wherein the drivetrain protection and management control unit stores vehicle characteristic data in memory and generates a data output summarizing a history of the vehicle characteristics.

26. The drivetrain protection and management system according to claim 25 wherein said drivetrain protection and management control unit communicates the data output via a wireless transmission to a fleet control center located remotely from a vehicle having the drive axle.

27. The drivetrain protection and management system according to claim 25 wherein said drivetrain protection and management control unit generates said control signal as an engine control signal to reduce engine torque.

28. The drivetrain protection and management system according to claim 25 wherein said drivetrain protection and management control unit generates said control signal as an engine retarder control signal.

29. The drivetrain protection and management system according to claim 25 wherein said plurality of vehicle characteristics comprises input data and includes engine speed, engine torque, operating ratio for a transmission, transmission output speed, driveline speed, and vehicle speed and wherein said drivetrain protection and management control unit receives at least a portion of said input data via a datalink that is in communication with said drivetrain protection and management control unit and an engine control unit.

30. The drivetrain protection and management system according to claim 25 wherein said drivetrain protection and management control unit determines a duration each time one of the third or fourth wheels is in said spin condition, compares the duration to a duration time threshold, identifies a spin duration event each time the duration exceeds the duration time threshold, and stores each spin duration event in memory.

31. The drivetrain protection and management system according to claim 23 including an engine sensor for monitoring engine speed, a transmission sensor for monitoring transmission speed, and a driveline sensor for monitoring driveline speed, and wherein said drivetrain protection and management control unit detects wheel spin for an unmonitored driven wheel that does not have wheel speed sensors by determining whether there is a change in at least one of engine speed, driveline speed, and transmission speed;

detecting a wheel spin condition at the unmonitored driven wheel when both the third and fourth wheels are in a no-spin condition and there is a change in speed of at least one of the engine, driveline, and transmission speeds; determining an unmonitored wheel spin value when the wheel spin condition is detected for the unmonitored driven wheel; comparing the unmonitored wheel spin value to the spin threshold; and generating the control signal to decrease wheel speed by reducing engine torque when the unmonitored wheel spin value exceeds the spin threshold.

32. The drivetrain protection and management system according to claim 23 wherein the drive axle comprises a tandem drive axle including a forward-rear axle and a rear-rear axle that receives driving input from the forward-rear axle, and wherein said third and said fourth wheels are associated with the rear-rear axle and wherein fifth and sixth wheels are to be associated with the forward-rear axle with the fifth and sixth wheels comprising unmonitored driven wheels, and wherein said drivetrain protection and management control unit determines wheel speeds for the unmonitored driven wheels based on the first, second, third, and fourth wheel speed signals, determines if any of the unmonitored driven wheels are experiencing a spin condition, and generates the control signal if a spin condition is detected at one of the unmonitored driven wheels.

* * * * *